United States Patent [19]
Dupuis

[11] Patent Number: 5,320,748
[45] Date of Patent: Jun. 14, 1994

[54] ACID DISPENSING SYSTEM FOR A SWIMMING POOL

[76] Inventor: Joseph A. Dupuis, 2921 Wood St., Sarasota, Fla. 34237

[21] Appl. No.: 116,073

[22] Filed: Sep. 2, 1993

[51] Int. Cl.⁵ .............................................. B01D 21/30
[52] U.S. Cl. .................................... 210/139; 210/169; 210/198.1
[58] Field of Search .............. 251/129.17; 137/624.11; 210/138, 139, 140, 169, 198.1, 205, 206, 416.2

[56] References Cited

U.S. PATENT DOCUMENTS

| | | | |
|---|---|---|---|
| 3,139,402 | 6/1964 | Armbrust | 210/169 |
| 3,195,551 | 7/1965 | Russell | 137/624.13 |
| 3,376,883 | 4/1968 | Douty et al. | 137/93 |
| 3,474,817 | 10/1969 | Bates | 210/169 |
| 3,528,545 | 8/1970 | Frazel et al. | 210/138 |
| 3,554,212 | 1/1971 | Maroney | 137/93 |
| 3,804,253 | 4/1974 | Wellman | 210/169 |
| 4,016,079 | 4/1977 | Severin | 210/169 |
| 4,033,871 | 7/1977 | Wall | 210/169 |
| 4,224,154 | 9/1980 | Steininger | 210/169 |
| 4,381,240 | 4/1983 | Russell | 210/169 |
| 4,714,235 | 12/1987 | Falk et al. | 251/129.17 |
| 4,954,799 | 9/1990 | Kumar | 251/129.17 |

Primary Examiner—Peter A. Hruskoci
Assistant Examiner—Robert J. Popovics
Attorney, Agent, or Firm—Charles J. Prescott

[57] ABSTRACT

An acid dispensing system and method of dispensing swimming pool acid into a water circulation system of a swimming pool. The acid dispensing system includes a unique normally closed valve having an inlet connected to a supply of swimming pool acid and an outlet connected to a suction line of the water circulation system. The opening and closing of the valve is solenoid operated and regulated by two separate timers. The first timer delays opening the valve for a period of time (preferably about an hour) following activation of the pump in the water circulation system. The second timer allows the valve to remain open momentarily immediately following the first timer delay during which acid is drawn by suction only into the water circulation system (a time period of about a minute or less).

2 Claims, 2 Drawing Sheets

ACID DISPENSING SYSTEM FOR A SWIMMING POOL

BACKGROUND OF THE INVENTION

1. Scope of Invention

This invention relates generally to swimming pool maintenance, and more particularly to a swimming pool acid dispensing system which automatically adds acid into the water circulation system of the swimming pool by suction to modify the pH level of the water.

2. Prior Art

It is well-known that the water in a swimming pool must be chemically modified to maintain its suitability for swimming. Among other chemicals and additives, the addition of swimming pool acid to maintain the pH neutral level of the swimming pool water is required to compensate for the tendency of the swimming pool water to become alkali after use. Such swimming pool acid is normally a diluted hydrochloric acid or "muriatic" acid solution.

The addition of swimming pool acid is typically done manually wherein the attendant will monitor the acid level by visual testing and thereafter add a "guesstimated" amount of acid to modify the pH level of water. Retesting is required.

In manually introducing acid into the swimming pool water, the attendant must handle the acid container and be exposed to fumes and possible direct contact with the acid itself. Additionally, the "guesstimate" of the proper amount of acid to be added may lead to over-acidifying the swimming pool water.

In introducing acid into the swimming pool water, it is preferred to do so after the water circulation system has been activated for a period of time so as to balance the preexisting level of chemicals within the swimming pool water.

Several systems for automatically introducing acid into the swimming pool have been disclosed in prior patents. One such device is disclosed in U.S. Pat. No. 4,381,240 invented by Russell which teaches a swimming pool water conditioning system which includes a manifold system for introducing acid into the water flow system.

Armburst, in U.S. Pat. No. 3,139,402 teaches a method of introducing both acid and chlorine into the swimming pool circulation system, but no time or volume regulation of the amount of acid introduced is disclosed, nor are there any details of any valve arrangement for this invention.

In U.S. Pat. No. 3,474,817, Bates discloses a chemical additive dispenser for swimming pool systems which includes a chlorinator requiring two separate inlet and outlet connections into the water circulation system as do other prior arrangements. The chlorinator appears to be regulated by metering of fluid into the bypass arrangement, rather than being of a timed nature.

Wellman in U.S. Pat. No. 3,804,253 also teaches an automatic chlorination and pH regulating system which feeds both chlorine and acid into a mixing chamber which is, in turn, tied directly into the water circulation system in parallel fashion, again requiring two separate conduits connected to the inlet and outlet sides of the mixing chamber.

Applicant is also aware of the invention of Severin disclosed in U.S. Pat. No. 4,016,079 teaching an automatic chlorine and pH control apparatus for swimming pools which includes a means for monitoring chlorine and acid level along with a flow-through acidifier, the entire arrangement connected in parallel with the pressure and suction sides of the pump of the water circulation system.

The present invention provides a simple one line connection arrangement for a delayed time introduction of acid into a swimming pool system. The invention takes advantage of the suction pressure side of the water circulation system, thus requiring only a single line connection. A sequential arrangement of two timers delays the introduction of acid into the swimming pool water for a first period of about an hour following the activation of the swimming pool pump to allow existing chemicals in the pool water to remix and stabilize. The second timer then allows acid to flow through a unique valve from an acid supply into the swimming pool system for a second period of about thirty to sixty seconds only. This timed sequence occurs each time the pump is activated, typically on a daily twenty four hour basis.

BRIEF SUMMARY OF THE INVENTION

This invention is directed to an acid dispensing system and method of dispensing swimming pool acid into a water circulation system of a swimming pool. The acid dispensing system includes a unique normally closed valve having an inlet connected to a supply of swimming pool acid and an outlet connected to a suction line of the water circulation system. The opening and closing of the valve is solenoid operated and regulated by two separate timers. The first timer delays opening the valve for a period of time (preferably about an hour) following activation of the pump in the water circulation system. The second timer allows the valve to remain open momentarily immediately following the first timer delay during which acid is drawn by suction only into the water circulation system (a time period of about a minute or less).

It is therefore an object of this invention to provide a simple to operate, easily installable and economically manufactured acid dispensing system for regulating the pH level of swimming pool water.

It is yet another object of this invention to eliminate the need for handling and being exposed to the detrimental effects of swimming pool acid on a regular basis while manually modifying the acid level of swimming pool water.

It is yet another object of this invention to provide a unique valve arrangement in conjunction with an acid dispensing system for swimming pools.

It is yet another object of this invention to introduce a controlled amount of acid into the water of a swimming pool on a timed basis only after the swimming pool water has been circulated a time sufficient to stabilize the preexisting chemical balance in the swimming pool water.

It is yet another object of this invention to provide an acid dispensing system for the automatic introduction of acid into the swimming pool water each time the pump of the water circulating system is activated.

It is still another object of this invention to provide a method of introducing acid into swimming pool water without the need for regular manual contact with, and exposure to, the acid.

In accordance with these and other objects which will become apparent hereinafter, the instant invention will now be described with reference to the accompanying drawings.

DETAILED DESCRIPTION OF THE INVENTION

Figure 1:
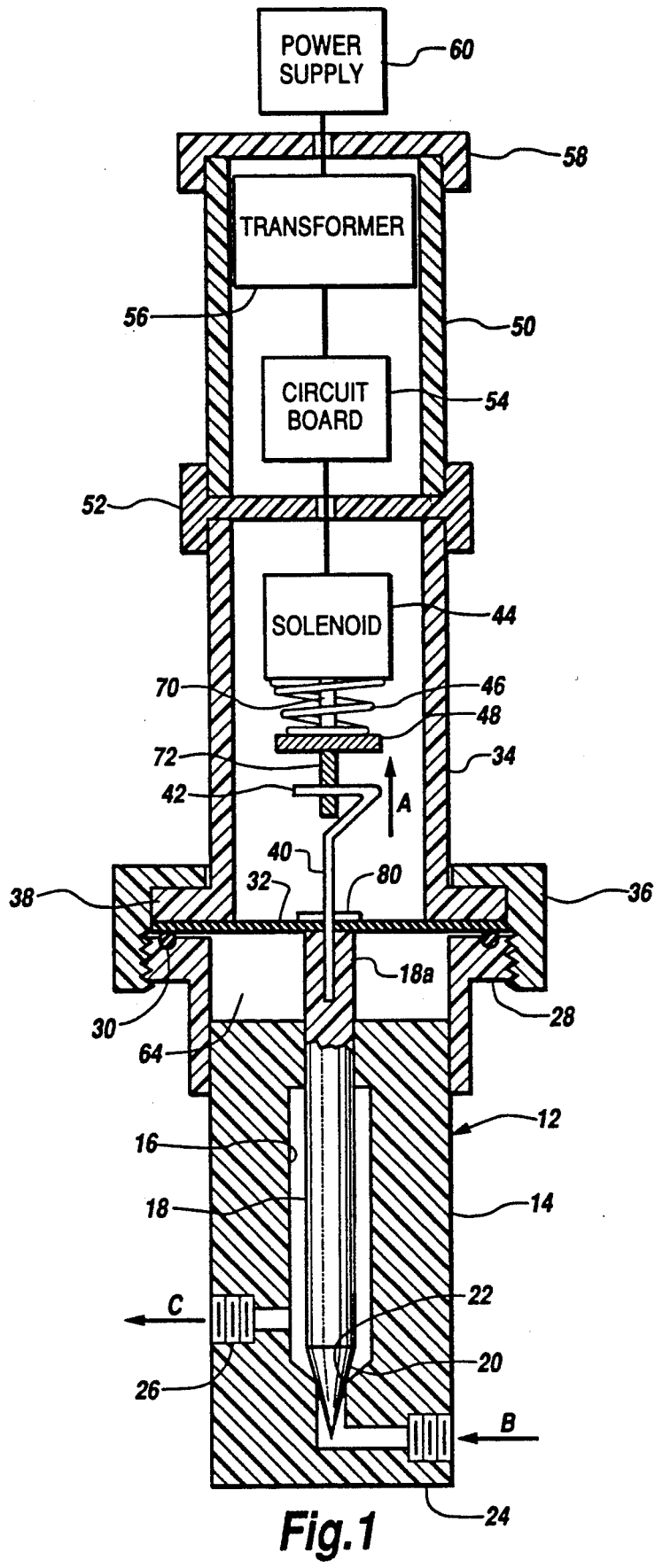
FIG. 1 is a section view of a unique valve and valve control arrangement for dispensing acid into a swimming pool water circulation system from a supply of acid.
Figure 2:
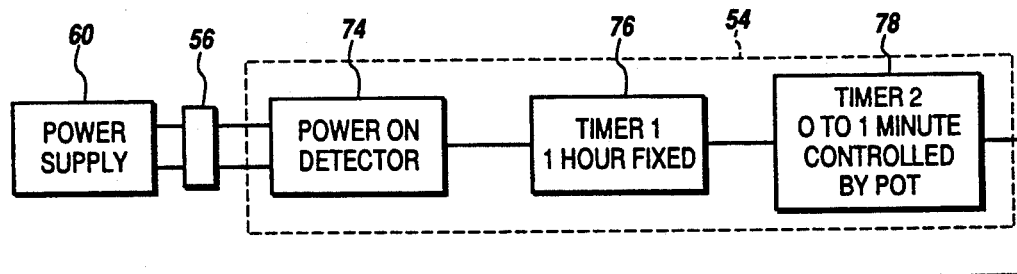
FIG. 2 is a schematic block diagram of the invention interconnected to a swimming pool and water circulation system.
Figure 2:
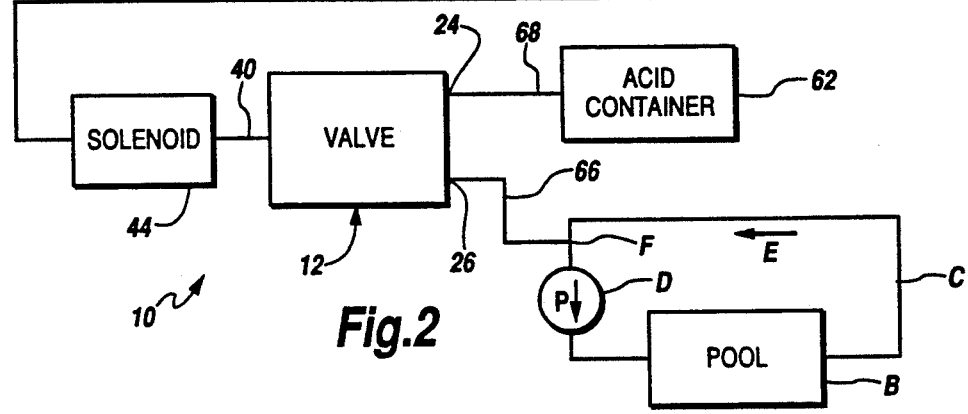

Referring now to the drawings, the invention is best seen in FIG. 2 as shown generally at numeral 10 and includes a unique valve 12 (best seen in FIG. 1) having a threaded inlet 24 which is interconnectable by flexible conduit 68 to a supply of swimming pool acid 62 such as a one gallon bottle commercially available and a threaded outlet 26 which is interconnectable by a rigid or flexible conduit 66 to a point F in the suction line of a water circulation system C of a swimming pool B.

The valve 12 includes a cylindrical plastic valve body 14 having a longitudinal cylindrical cavity 16 formed therein extending from an upper end of the valve body 14 downwardly thereinto as shown in FIG. 1. Adjacent the bottom end of the cavity 16 is a conically shaped valve seat 22, the bottom end of cavity 16 extending to threaded inlet 24. Threaded outlet 26 is positioned adjacent and above valve seat 22.

Disposed longitudinally for slidable translation within cavity 16 is a cylindrical valve shaft 18 having a tapered lower end 20. When the valve shaft 18 is in the position shown in FIG. 1, the valve 12 is closed, blocking fluid communication between the inlet 24 and the outlet 26.

The upper end 18a of valve shaft 18 extends beyond the end of valve body 14 into chamber 64 and terminating at a lower surface of a flexible, elastic, non-porous sealing membrane 32. This membrane 32 is generally flat and disc shaped and is positioned in sealing arrangement adjacent its perimeter against an O-ring 30 positioned between two threadably mating union portions 28 and 36 which form a decoupleable union between valve body 14 and flanged tubular member 34.

Mounted within tubular member 34 is a solenoid 44 having an actuator shaft 70 downwardly extending therefrom to engage into an apertured clip 72. Plate 48 acts against compression spring 46 to bias actuator shaft 70 downwardly in the position shown when not in use.

A connecting rod 40 has an upper hook 42 which is interengagable into clip 72 as shown. The lower end of this connecting rod 40 is securely embedded into the upper end of the valve shaft 18 as shown. The upper end of valve shaft 18 is secured against sealing membrane 32 by clip 80 on connecting rod 40. By this arrangement, when solenoid 44 is activated, its actuator shaft 70 moves in the direction of arrow A, along with valve shaft 18, whereupon fluid communication is opened between the inlet 24 and the outlet 26.

To reiterate, the sealing membrane 32 serves to prevent acid entering the inlet 24 in the direction of arrow B, passing through valve seat 22 and exiting in the outlet 26 in the direction of arrow C from moving beyond chamber 64. Because valve shaft 18 is slidably connectable within the valve within cavity 16, acid entering into the cavity 16 is likely to pass beyond the mating surfaces between the valved body 14 and the valve shaft 18, thus requiring the sealing membrane 32.

A circuit board 54 is housed within a coaxially mounted plastic tubing 50 operably connected to a transformer 56 which, in turn, is electrically connected to a power supply 60. The circuit board 54 and transformer 56 are sealed within the tubing 50 by end cap 58. The other end of tubing 50 is sealingly engaged into coupling 52 coaxial with tubing member 34.

As best seen in FIG. 2, the circuit board 54 shown in phantom includes a "power on" detector 74 which is provided in conjunction with the first timer 76 to accomplish the timed delay of transferral of power to the second timer 78.

The first timer 76 receives a signal from the power on detector 74 when the pump D is initially activated, typically at the beginning of a day. However, no electrical power is immediately transmitted by the first timer 76 to solenoid 44 for a delay period of approximately one (1) hour which is preprogrammed at the time of manufacture.

After the first timer 76 has acted to delay transmittal of power for the preprogrammed period, power is then transferred to the second timer 72. This second timer 72 then forwards the power signal into solenoid 44 which then opens valve 12 as previously described. At that point, acid will be drawn by suction from acid container 62 through flexible conduit 68 into the inlet 24 of valve 12 and then out of the outlet 26 into the suction line side of the water circulating system C which flows water in the direction of arrow E out from and then back to the swimming pool B.

The second timer 78 thus is programmed to continue to allow power transfer into solenoid 44 in this manner for a variable period of time which is adjustable by the attendant via a potentiometer 82 on circuit board 54. This selectable time for transmitting power by the second timer 78 is typically in the range of up to about one minute.

Figure 3:
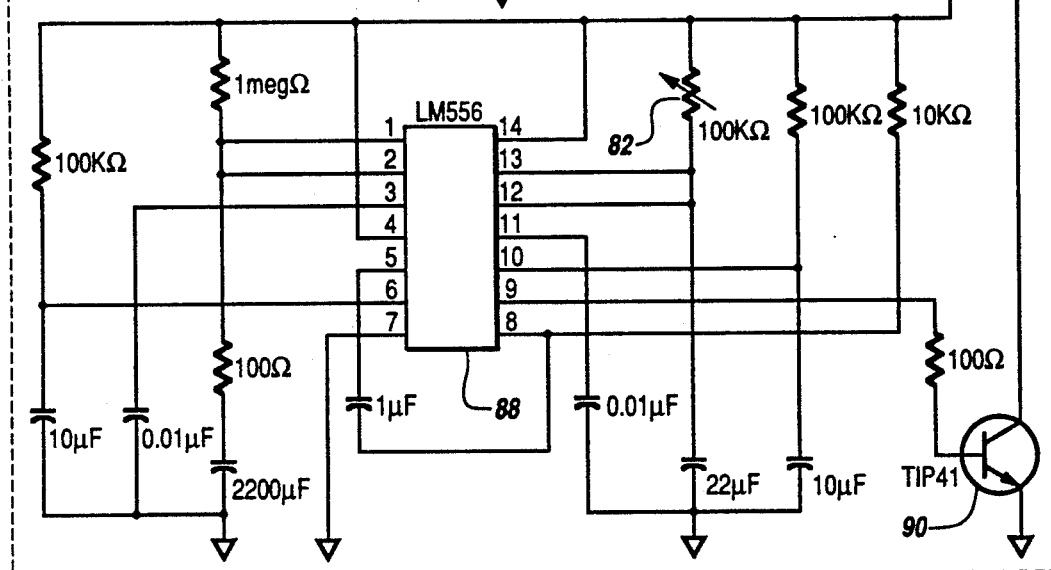
FIG. 3 is a schematic circuit diagram of the electronic valve control system of the invention.

Referring to FIG. 3, the voltage received from transformer 56 into a rectifying arrangement 84 converts the 24 v a.c. transformer output signal into a 24 v d.c. signal output of the rectifier 84. A voltage rectifier 86 (chip 7805) insures maintaining a proper range of 5 v. d.c. as its output to an integrated circuit LM556 which performs both timer functions above-described. A switching transistor 90 serves as a power relay and is typically more reliable than a conventional electromagnetic relay.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An acid dispensing system for regulating the pH level of water in a swimming pool, the swimming pool having a water circulation system with a pump, said acid dispensing system comprising:

a one way normally closed valve having an inlet and an outlet;

an inlet conduit connected at a first end thereof to said valve inlet and connectable at a second end thereof to a supply of swimming pool acid;

an outlet conduit connected at a first end thereof to said valve outlet and connectable at a second end thereof to, and forming an only fluid connection with, the water circulation system, said fluid connection being positioned in the water circulation system on a suction side of the pump between a pool water outlet and the pump whereby the acid is drawn into the water circulation system when said valve is in an open position;

a first timer means connected between a power supply for the pump and said valve for delaying transferal of electrical power to open said valve for a first preselected time period following activation of the pump whereby dispensing of the swimming pool acid is delayed for said first preselected time period following activation of the pump;

a second timer means connected to said first timer means for disconnecting the electrical power thereby closing said valve after a second preselected time period immediately following said first time period whereby said valve is only open for dispensing a limited quantity of swimming pool acid;

said valve comprising:
- a valve body having a cylindrical longitudinal cavity extending into said valve body from one end thereof;
- a valve seat formed adjacent a bottom closed end of said cavity;
- said inlet formed into said valve body in fluid communication with said cavity at said bottom end thereof;
- said outlet formed into said valve body in fluid communication with said cavity at a point along said cavity between said valve seat and said one end of said valve body;
- an elongated cylindrical valve shaft slidably mounted in said cavity and having a first end which is engageable into and closing fluid flow through said valve seat;
- a second end of said valve shaft extending beyond said one end of said valve body to define an exposed distal end of said valve shaft;
- a thin, flat, flexible sealing membrane connected at a central point thereof to said exposed distal end and sealingly engaged around a perimeter of said one end of said valve body whereby swimming pool acid entering said cavity through said inlet only exits said cavity through said outlet;
- a biasedly closed solenoid connected coaxially with said cavity at said distal exposed end of said valve shaft, said solenoid operably connected to said power supply through said first and second timer means for opening and closing said valve;
- said solenoid being mounted within a first tubular coaxial extension of said valve body and having an elongated actuator shaft downwardly extending therefrom operably connected to said distal end of said valve shaft;
- a circuit board including said first and second timer means housed within a second tubular coaxial extension of said first extension and operably connected to a transformer also housed within said second extension, said transformer being operably connectable to said power supply.

2. An acid dispensing system for a swimming pool comprising:

valve means having an inlet connected to a supply of swimming pool acid and an outlet connected to a suction line of a swimming pool water circulation system for controlledly permitting flow of swimming pool acid into the suction line;

a first timer means for delaying opening of said valve means for a first preselected time period immediately following activation of the water circulation system;

a second timer means for holding said valve means in an open position for a second preselected time period immediately following said first preselected time period;

said first time period substantially longer than said second time period;

said valve means comprising:
- a valve body having a cylindrical longitudinal cavity extending into said valve body from one end thereof;
- a valve seat formed adjacent a bottom closed end of said cavity;
- said inlet formed into said valve body in fluid communication with said cavity at said bottom end thereof;
- said outlet formed into said valve body in fluid communication with said cavity at a point along said cavity between said valve seat and said one end of said valve body;
- an elongated cylindrical valve shaft slidably mounted in said cavity and having a first end which is engagable into and closing fluid flow through said valve seat;
- a second end of said valve shaft extending beyond said one end of said valve body to define an exposed distal end of said valve shaft;
- a thin, flat flexible sealing membrane connected at a central point thereof to said exposed distal end and sealingly engaged around a perimeter of said one end of said valve body whereby swimming pool acid entering said cavity through said inlet only exits said cavity through said outlet;
- a biasedly closed solenoid connected coaxially with said cavity at said distal end of said valve shaft, said solenoid operably connected to said power supply through said first and second timer means for opening and closing said valve;
- said solenoid being mounted within a first tubular coaxial extension of said valve body and having an elongated actuator shaft downwardly extending therefrom operably connected to said distal end of said valve shaft distal end;
- a circuit board including said first and second timer means housed within a second tubular coaxial extension of said first extension and operably connected to a transformer also housed within said second extension, said transformer being operably connectable to said power supply.

* * * * *